United States Patent [19]

Mayer

[11] 3,989,989
[45] Nov. 2, 1976

[54] CONVEYOR OVERSPEED-UNDERSPEED AND/OR SLIP DETECTOR

[75] Inventor: Gerald C. Mayer, Wayne, N.J.

[73] Assignee: Litton Systems, Inc.

[22] Filed: Apr. 30, 1975

[21] Appl. No.: 573,077

[52] U.S. Cl. .............................. 318/72; 198/855; 317/5; 340/268
[51] Int. Cl.² .......................................... H02P 5/50
[58] Field of Search ................. 198/40, 232; 317/5, 317/19; 318/67, 68, 72, 463,464; 340/259, 268

[56] References Cited
UNITED STATES PATENTS

| | | | |
|---|---|---|---|
| 2,443,048 | 6/1948 | McComb | 318/67 |
| 2,695,376 | 11/1954 | Emms et al. | 317/5 |
| 2,808,922 | 10/1957 | Lutman, Jr. | 198/203 |
| 2,875,388 | 2/1959 | Scheu | 318/67 X |
| 2,888,129 | 5/1959 | Chapman | 198/76 X |
| 3,050,670 | 8/1962 | Anger et al. | 318/72 |
| 3,084,307 | 4/1963 | Landis | 317/5 |
| 3,612,252 | 10/1971 | Yu | 198/167 X |
| 3,877,003 | 4/1975 | Kawashima | 340/268 |

*Primary Examiner*—Johnny D. Cherry
*Assistant Examiner*—Richard K. Thomson
*Attorney, Agent, or Firm*—Morris I. Pollack

[57] ABSTRACT

A control system is provided for stopping the operation of a bulk material conveyor system in response to an indication that the speed of either drive or driven elements thereof are above or below acceptable amounts, that the output speed of a particular material handling component falls below an acceptable difference from the input speed to said component, or that the speed of an upstream material handling component falls outside an acceptable difference with respect to the speed of a downstream material handling component feeding material to said upstream component. Speed indication is provided by the electrical signal output from dc tachometer-generators associated with the drive or driven shafts of the component whose speed is being sensed. The signals are, in turn, transmitted to the input networks of speed comparators; there being one such comparator for each comparison to be made with each such speed comparator incorporating an integrated circuit operational amplifier and an emitter follower power amplifier connected as a comparator circuit with hysteresis. A reed relay also incorporated in the speed comparator, operates in response to a signal from said comparator circuit indicative of improper material handling component operation to effect stoppage of the conveyor system.

16 Claims, 12 Drawing Figures

TABLE FOR SELECTION OF TACHOMETER GENERATORS AND INPUT CIRCUIT DROPPING RESISTORS

| GEAR RATIO | | | | | VOLTS | RESISTOR 306 | RESISTOR 308 |
|---|---|---|---|---|---|---|---|
| 2:1 | 1:1 | 1:2 | 1:4 | 1:6 | | | |
| INPUT | SHAFT | SPEED- | RPM | | | | |
| 2000 | 1000 | 500 | 250 | | 25 | 15K | 12.5K |
| 1920 | 960 | 480 | 240 | | 24 | 14K | 11.5K |
| 1840 | 920 | 460 | 230 | | 23 | 13K | 10.5K |
| 1760 | 880 | 440 | 220 | | 22 | 12K | 9.5K |
| 1680 | 840 | 420 | 210 | | 21 | 11K | 8.5K |
| 1600 | 800 | 400 | 200 | | 20 | 10K | 7.5K |
| 1520 | 760 | 380 | 190 | 126 | 19 | 9K | 6.5K |
| 1440 | 720 | 360 | 180 | 120 | 18 | 8K | 5.5K |
| 1360 | 680 | 340 | 170 | 113 | 17 | 7K | 4.5K |
| 1280 | 640 | 320 | 160 | 106 | 16 | 6K | 3.5K |
| 1200 | 600 | 300 | 150 | 100 | 15 | 5K | 2.5K |
| 1220 | 560 | 280 | 140 | 93 | 14 | 4K | 1.5K |
| 1040 | 520 | 260 | 130 | 86 | 13 | 3K | .5K |
| 960 | 480 | 240 | 120 | 80 | 12 | 2K | 0 |
| 880 | 440 | 220 | 110 | 73 | 11 | 1K | 0 |
| | | 400 | | 67 | 10 | 0 | 0 |

NOTE: SELECTION OF VALUES SHOULD BE TO THE CLOSEST LISTED VALUE WHICH IS LESS THAN ACTUAL.

CONVEYOR OVERSPEED-UNDERSPEED AND/OR SLIP DETECTOR

BACKGROUND OF INVENTION

Field of Application

This invention relates to speed controls for bulk material conveyor systems, and more particularly to underspeed, overspeed and slip detector controls for conveyor belts and other material moving components of such systems.

Description of Prior Art

Bulk material handling conveyor systems usually include at least one belt conveyor which receives bulk material, such as coal, iron ore, cement, etc. to transport same between locations removed one from the other for the purpose of stocking, processing, shipping, or other required handling incident to the use of the bulk material. Such systems may also include: multiple conveyors located in a collinear fashion (which may be referred to as upstream and downstream conveyors); conveyors which co-operate to move material in two different directions (which may be referred to as a main conveyor and a shuttle conveyor); and a conveyor co-operating with a bulk material elevator wheel for changing the level of material flow.

The increasing demand for large, highly complex and high speed bulk material conveyor systems has created a need for more effective control devices to detect malfunctions in such systems, and protect the expensive mechanical components required in such systems. Unfortunately presently available control systems are few in number, are high in cost, are usually designed for a particular system and thus lack the versatility to permit use thereof with another system without significant re-design and modifications, and quite often provide inoperable solutions.

SUMMARY OF INVENTION

It is therefore an object of this invention to provide a novel and improved speed control system for a bulk material conveyor system.

It is another object of this invention to provide novel and improved underspeed, overspeed and slip detector controls for material handling belts and other material moving components of a bulk material conveyor system.

It is a further object of this invention to provide novel and improved speed controls for a bulk material conveyor system to shut down operation of the system; when the speed of the drive or driven components thereof exceed or fall below certain established reference speeds; when the output speed of any particular component falls below a certain pre-set range with respect to the input speed to said component; or when an unacceptable speed differential develops between two co-operating material moving components, when one of such components feeds material to the other component.

It is a still further object of this invention to provide novel and improved speed controls for a bulk material conveyor system wherein the speeds of movement of the various material moving components of the system are converted to electrical signals indicative of said speeds, and wherein said signals are compared to each other, or to reference signals, to provide for stoppage of the conveyor system in response to a comparison indicating a speed or speeds falling outside acceptable parameters.

It is yet still another object of this invention to provide a novel and improved speed comparitor.

It is yet still a further object of this invention to provide a novel and improved speed comparitor for use with a bulk material conveyor system.

It is yet still a further object of this invention to provide a novel and improved speed comparitor for generating a signal indicative of an overspeed, underspeed, slip, or improper speed differential condition for the various material moving components of a bulk material conveyor system.

It is yet still a further object of this invention to provide a novel and improved speed comparitor, which comparitor is, easily adjusted to create a balanced condition, readily and easily settable to establish an acceptable variance from said balanced condition, and which, by simple connections to its input terminals in predetermined modes, will exercise a control function over a bulk material conveyor system to arrest operation thereof due to an overspeed, underspeed, slip or improper speed differential condition.

This invention involves: the provision of speed sensors for those drive and driven components of a bulk material conveyor system whose improper operation would require a shut down of the system; the generation by said speed sensors of electrical signals indicative of the speed of the component being sensed; and the processing of said signals by a number of simple, efficient, and identical speed comparitors (these being a comparitor for each comparison to be made) each of which in response to an unacceptable comparison will exercise a control to shut down the system.

Other objects, features, and advantages of the invention in its details of construction and arrangement of parts, will be seen from the above, from the following description of the preferred embodiment when considered in conjunction with the drawings, and from the appended claims.

DESCRIPTION OF THE PREFERRED EMBODIMENT

For convenience the invention will be described as applied to speed controls for a bulk material conveyor system utilizing a multiplicity of dc tachometer-generators to provide signals indicative of the input and output speeds of a downstream conveyor which receives material from bin storage, an upstream conveyor which receives the material from the downstream conveyor, a material elevator wheel which receives material from the upstream conveyor and changes the level of transport thereof, the seal belt associated with the elevator wheel, and the shuttle conveyor which receives the material from the elevator wheel; said speed signals, in turn, being conducted either singly or in pairs depending upon the speed comparison to be made to a multiplicity of speed comparitors, with each comparitor being capable of making a single comparison and of shutting down the entire conveyor system in response to an unacceptable comparison. It should be understood, nevertheless: that without departing from the scope of this invention that any speed sensor capable of generating an appropriate signal indicative of speed may be used, that the material need not be supplied from a bin but may be dumped, conveyed or otherwise deposited on the downstream conveyor, that there may be more then two collinear conveyors or if desired only one, that means other then a material elevator may be utilized to change the level of material flow, or that such means may be eliminated if the level of material flow is not to be changed, that more then one shuttle conveyor may be utilized or that the shuttle conveyor itself may be eliminated if not essential to the material flow, that additional input speeds and output speeds may be compared or the number of such comparisons reduced to those which are essential to effective control of the conveyor system, and that a single speed comparitor may be easily modified to render same receptive to more then a single comparison.

Figure 1:
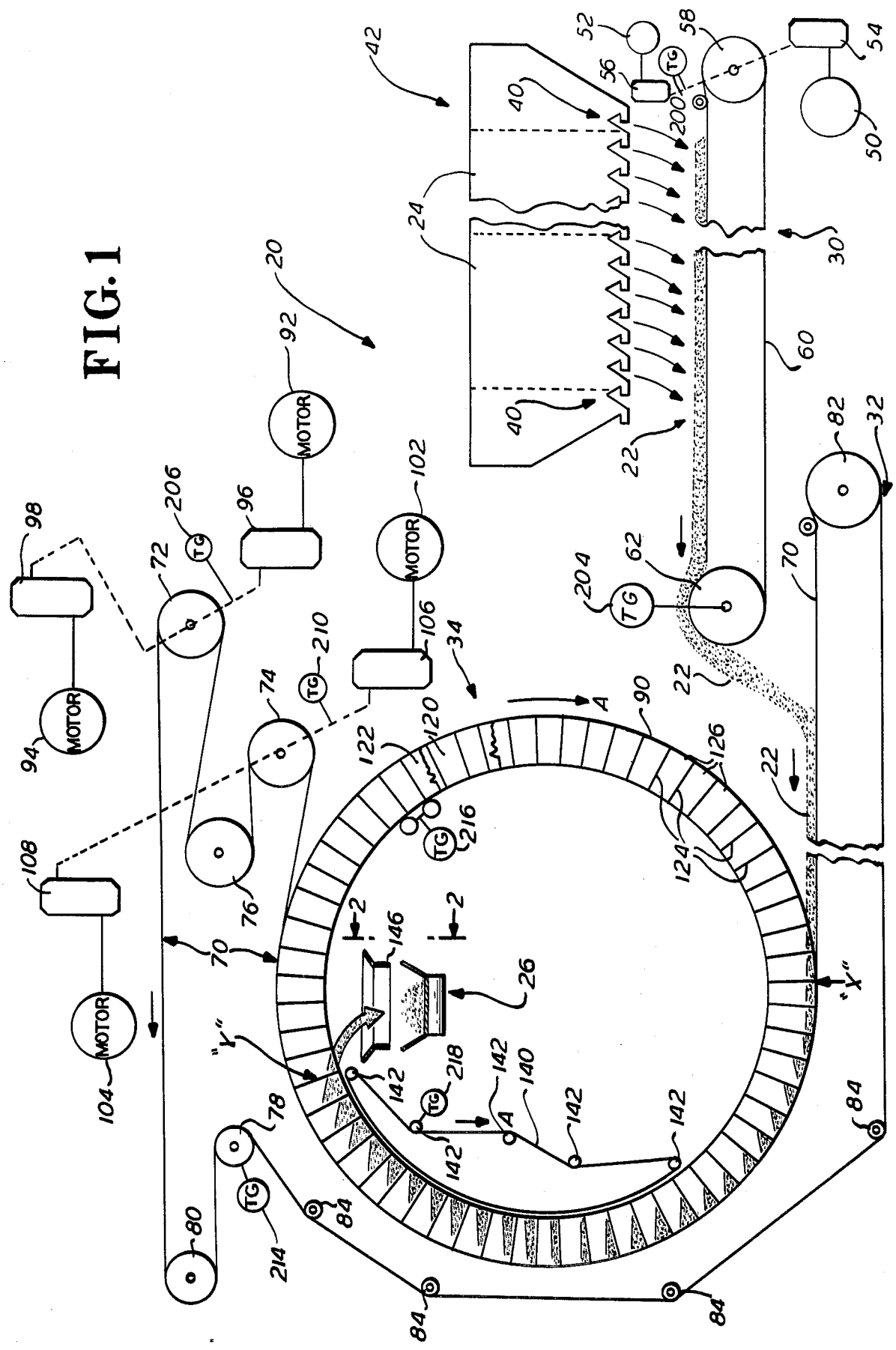
FIG. 1 is a schematic showing of a conveyor system incorporating the instant invention.

With reference to FIG. 1 there is generally shown at 20 a bulk material conveyor system for transporting bulk material 22 (which may be coal, iron ore, cement, stone, etc.) from material storage bins 24 to a shuttle conveyor 26 (FIGS. 1 and 2) from which the material leaves the system for whatever use or purpose requires the material. Material 22 initially drops from bins 24 onto a first, or downstream, conveyor 30 which transports material 22 to and deposits same upon a second, or upstream conveyor 32. A material elevator wheel assembly 34 coacts with upstream conveyor 32 to raise the level of material 22. Thereafter material elevator 34 deposits material 22 upon shuttle conveyor 26.

Figure 3:
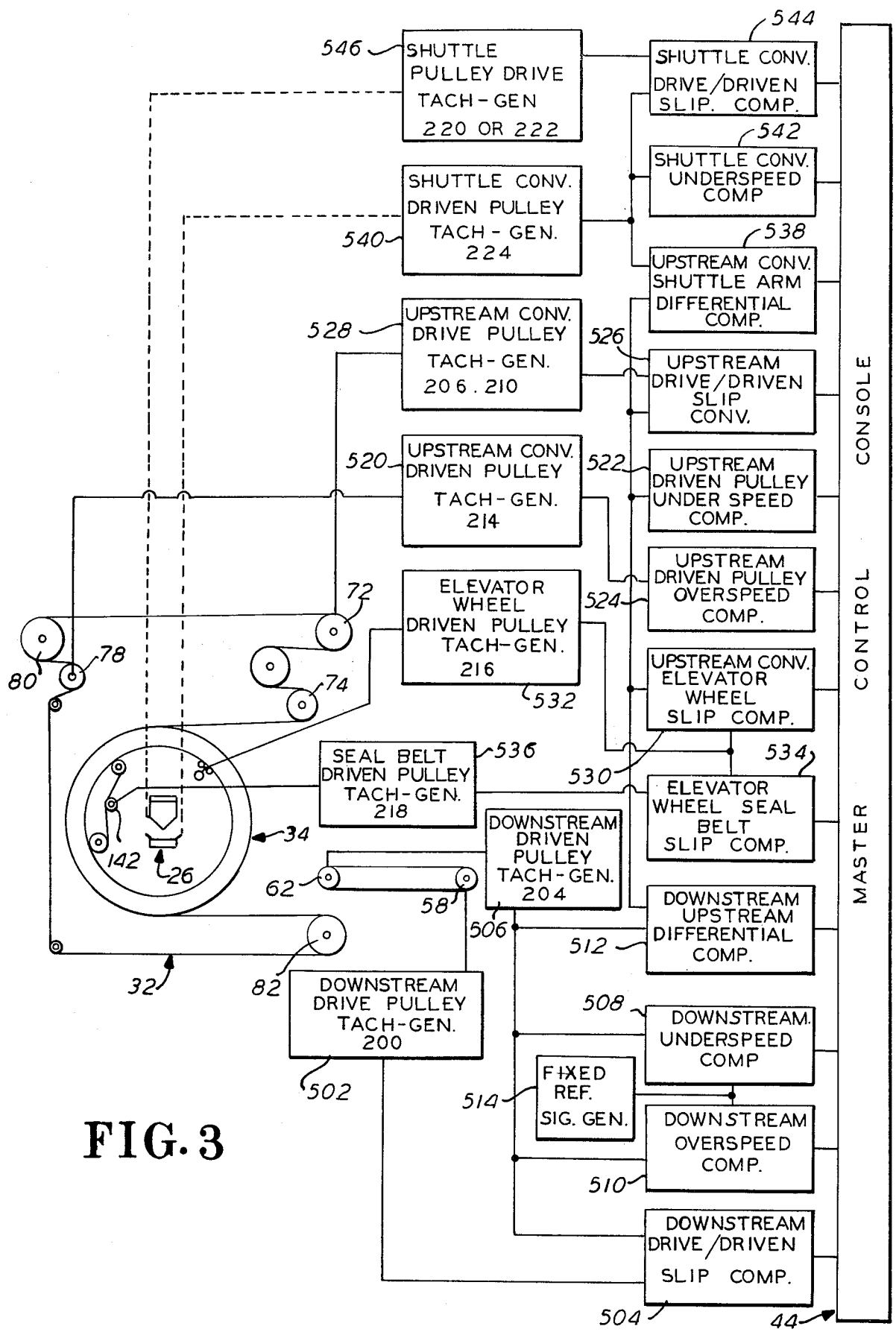
FIG. 3 is a block diagram of the controls for the conveyor system of FIG. 1 simplified to more clearly portray the instant invention.

Material storage bins 24 are of conventional construction and are equipped with remotely controlled gates 40 operable to control discharge of material 22 onto downstream conveyor 30. In the example shown bins 24 each comprise a section of a material storage assembly 42 and each bin is equipped with one or more gates 40 remotely controlled from the operator console 44 (FIG. 3). Material 22 is deposited in bins 24 by any suitable means, such as by conveyor or from a bucket loader, etc., and if preferred may be otherwise stored in any convenient manner and removed from storage by suitable means for subsequent deposit upon downstream conveyor 30. Bins 24 may also constitute the storage area of a hopper car, or the hold of a vessel.

Downstream conveyor 30 (FIG. 1) is of conventional construction suitable for the material 22 to be transported. A motor set including a pair of motors 50, 52 and reducers 54, 56 are suitably connected to a drive pulley 58 to drive a conveyor belt 60; and includes a driven pulley 62 as well as other attendant structure (not shown) required for proper conveyor operation. Appropriate controls, operated from operator console 44 (FIG. 3) are interconnected in conventional manner to motors 50, 52.

Upstream conveyor 32 (FIG. 1) includes a conveyor belt 70 which is entrained about a pair of drive pulleys 72, 74, a number of driven pulleys 76, 78, 80 and 82, and a number of idler wheels 84. Belt 70 also coacts with elevator wheel 90 of elevator wheel assembly 34 to drive same in the clockwise direction (arrow A of FIG. 1). A first motor set including motors 92 and 94 and gear reducers 96, 98 and a second motor set including motors 102, 104 and gear reducers 106 and 108 are suitably connected to drive pulleys 72 and 74 respectively to impart drive power thereto. Appropriate controls are provided for the motor sets and are operable from operators console 44 (FIG. 3).

Elevator wheel assembly 34 (FIGS. 1 and 2) is of conventional construction suitably mounted to receive material from and to be driven by conveyor belt 70. Wheel 90 includes a pair of opposed annular side walls 120, 122 spanned by a number of divider walls 124 which subdivide wheel 90 into a number of sections 126 open at their radially outermost and radially innermost ends. As wheel 90 rotates it moves into engagement with conveyor belt 70 at location "X" (FIG. 1) and in doing so a quantity of material 22 becomes trapped in each section 126 due to belt 70 closing the radially outermost end thereof.

A seal belt 140 is conventionally mounted within wheel 90 by a number of idler wheels 142 and is driven in the clockwise direction (FIG. 1 — arrow A) by its contact with the inner annular surfaces of wheel 90. Seal belt 140 serves to prevent material 22 from escaping out the radially innermost opening of sections 126 until material 22 reaches location "Y"; at which location material 22 drops into a discharge chute 146, FIGS. 1 and 2) and therefrom onto shuttle conveyor 26.

Shuttle conveyor 26 (FIGS. 1 and 2) includes a conveyor belt 160 (FIG. 2) suitably chosen and conventionally entrained about a pair of drive pulleys 162, 164 and a number of driven pulleys 166. A suitable motor 168 and gear reducer 170 provide power to drive pulley 162; while a suitable motor 172 and gear reducer 174 provide power to drive pulley 164.

Appropriate controls are provided for motors 168, 172 and are also operable from operators console 44 (FIG. 3).

It should be obvious that either single motor drives, such as shown for shuttle conveyor drive pulleys 162, 164, or dual motor drives such as hown for upstream conveyor belt pulleys 72, 74 may be used depending upon the drive characteristics desired. In addition the use of gear reducers, or the elimination thereof, will depend upon the conveyor design. Neither the particular conveyor configurations shown, nor their attendant motors and/or gear reducers, nor the material to be transported are significant to the instant invention. They are shown to provide the environment within which the instant invention is incorporated.

For each speed that is to be monitored, whether it be a drive speed or a driven speed, a signal must be generated indicative of the value of the speed. This is accomplished, in the preferred embodiment, by applying dc tachometer generators to the various drive and driven shafts whose speeds are to be so monitored. Conventionally available Esterline Angus Model D Tachometer Generators are used herein but equivalent speed sensors such as ac tachometer generators, pulse generators, etc., may be used as long as they provide an electrical signal output.

Accordingly such tachometer generators are shown in FIG. 1 at 200 between reducer 54 and drive pulley 58 monitoring the combined input drive speed of motors 50 and 52 to drive pulley 58; at 204 monitoring the speed of downstream conveyor 30 as reflected by driven pulley 62 thereof; at 206 between reducer 96 and drive pulley 72 and at 210 between reducer 106 and drive pulley 74 monitoring the combined input drive speed of motors 92, 94, 102 and 104 to drive pulleys 72, 74 of upstream conveyor 32; at 214 monitoring the driven speed of upstream conveyor 32 as reflected by driven pulley 78 thereof; at 216 monitoring the speed of material elevator wheel 90; at 218 monitoring the speed of seal belt 140 as reflected by driven pulley 142 thereof; at 220 (FIG. 2) between reducer 174 and drive pulley 162, and at 222, between reducer 174 and drive pulley 164, monitoring the input drive speed of motors 168 and 172 to drive pulleys 162, 164 of shuttle conveyor 26; and at 224 monitoring the driven speed of shuttle conveyor 26 as reflected by driven pulley 166 thereof.

Figures 4, 6:
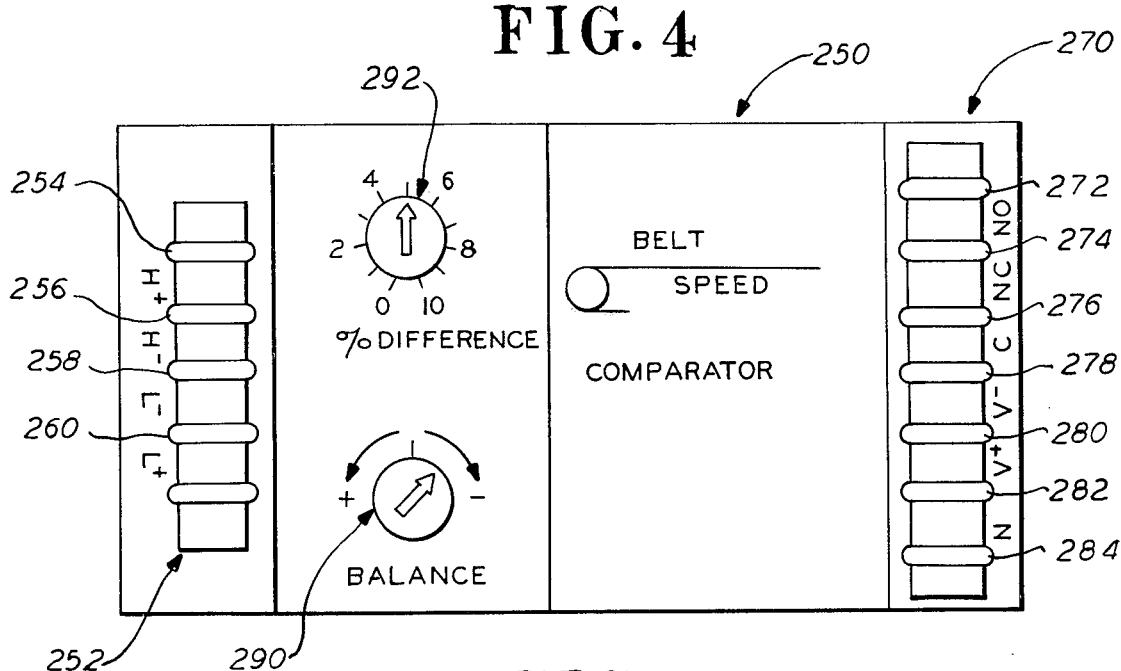
FIG. 4 illustrates the front panel and externally accessable controls and connections for the speed comparitor of the instant invention.
FIG. 6 shows a Table For Selection of Tachometer Generator and Input Circuit Dropping Resistors.

The tachometer generators referred to above, while all providing an electrical signal output, are constructed and conventionally available with different gearing between their respective input shafts and armatures to establish predetermined gear ratios therebetween. Selection of the specific tachometer generator will depend upon the maximum speed of the shaft to be measured and may be made with reference to the tachometer selection table of FIG. 6.

Each tachometer generator, in conventional manner, generates a dc electrical signal proportional to the speed of rotation of the shaft it is monitoring; and therefor of either the associated input drive speed to a belt or material moving component, or output drive speed of a belt or material moving component. The signals so generated are, in turn, conducted to selected and pertinent speed comparitors 250 (FIGS. 3 and 4); there being one such comparitor 250 for each comparison to be made.

Speed comparitors 250 are all identical internally and differ only in the electrical connections for receiving the input signal or signals generated by the tachometer generators, and for receiving a reference input signal when the signal generated by a tachometer generator is to be compared to a selected standard.

Each speed comparitor 250 (FIG. 4) includes a speed signal receiving terminal strip 252 with connection terminals 254, 256, 258 and 260 designated H+, H−, L−, and L+ respectively. A power input and control output terminal strip 270 is also provided for speed comparitor 250 and includes connection terminals 272, 274, 276, 278, 280, 282 and 284 designated NO, NC, C, V−, V+ and N respectively.

A balance control knob 290 adjustable between a "−" (minus) position and a "+" (plus) position and a % (percent) difference setting knob 292 adjustable to settings between 0 and 10% are accessable on the face of speed comparitor 250.

Percent difference knob 292 controls the setting of a potentiometer 300 forming a part of speed comparitor circuit 302 (FIG. 5); while balance control knob 290 (FIG. 4) controls the setting of a potentiometer 304 within said circuit 302. Terminals 254, 256 (FIG. 4 and 5) serve to receive a first signal I-1 either generated by a tachometer generator or from a reference source as will be hereinafter described; while terminals 258, 260 serve to receive a second signal I-2 either generated by a tachometer generator or from a reference source. A pair of input circuit dropping resistors 306, 308 are included within the circuit. They are selected, with reference to the table for selection of input circuit dropping resistors (FIG. 6), based upon the norminal shafts speeds under operating conditions of a tachometer generators providing the I-1 and I-2 signals. The selection is made so that for identical belt speeds the signal in volts per foot per minute, generated by the tachometer generators as modified resistors 306, 308 will at M-1 and M-2, to be approximately equal.

Additional dropping resistors 310, 312 and adustment potentiometers 300 & 304 are also included within the circuit to provide for final calibration.

The respective outputs from potentiometers 300 and 304 appear as signals S-1 and S-2 respectively and are presented to an operational amplifier 330 as the algebraic difference S-3 of said signals S-1 and S-2. Operational amplifier 330 is of the type available from National Semiconductor Corporation of Santa Clara California and designated by them as LM201A but any equivalent device may be used. An appropriate and conventional input power supply is provided to amplifier 330 via the V−, and V+ terminals 278 and 280 respectively. A zener diode 332 is also electrically connected to amplifier 330 and serves as a clamp to limit any output from amplifier 330 to 11 volts so as not to overload other components at circuit 302.

The output from amplifier 330 is applied to the base of a transistor emitter follower 334 through a dropping resistor 336 appropriately selected and electrically included within the circuit. Another dropping resistor 338 is included in the circuit from the V+ terminal 280 to the collector of transmitter emitter follower 334.

The output of emitter follower 334 is utilized to control the operation of a reed relay 340; which, when energized, operates a switch blade 342 to move same into engagement with a contact 344 to maintain a circuit for continuing the operation of the conveyor system when otherwise operational. De-energizination of reed relay 340 results in the movement of switch blade 342 into engagement with a contact 346 opening the circuit to the conveyor system to stop operation thereof. By suitable connection to terminals 272, 276 the movement of blade 342 into engagement with contact 346 may also be utilized to sound an alarm, energize a warning light, activate braking mechanism or any other function desired when the conveyor system is to be stopped in this manner.

A diode 348 is included in conventional manner within the circuit of relay 340, to provide a loop for dispatching the inductive load of the relay coil, 340 when it de-energizes.

Resistors, 350 and 316 are selected to provide a hygersis loop to avoid relay chatter. Resistor 314 is made equal in value to 316 to balance the amplifier input circuit. Capacitor 318, provides some filtering for the input and is optional.

When speed comparator circuit 302 is operational a first signal I-1 is applied to terminals 254, 256 and a second signal I-2 is applied to terminals 258 and 260. The V−, and V+ applied to terminals 278 and 280 respectively render amplifier 330 operational. A positive input signal S-3 is presented to amplifier 330, when S-2 is greater than S-1. The amplifier 330, output will then be positive, and will be limited to 11 volts by the Zener Diode 332. This places the emitter follower 334 in the conductive stage to energize reed relay 340 and maintain the circuit to the conveyor system operative through the contact of blade 342 and contact 344.

The parameters of circuit 302 are such that when set up as will be hereinafter described the output signal S-1 from potentiometer 300 is always less than the output signal S-2 from potentiometer 304. When the respective output signals S-1 and S-2 from potentiometers 300 and 304 are summed, and the resultant signal S-3 is positive (i.e. as long as S-2 is greater then S-1) amplifier 330 will provide positive output and reed relay 340 will remain energized. When the resultant signal S-3 is negative (i.e. when S-1 exceeds S-2) amplifier 330 will no longer provide an output to emitter follower 334 and reed relay 340 will be deenergized.

When initially setting up speed comparitor 250 signals I-1 and I-2 should be generated so as to represent ideal conditions of desired speeds (i.e. not underspeed, not overspeed, no slip, proper differential). Percent knob 292 should be initially set to "0"% thus positioning potentiometer 300 accordingly. If conditions were ideal S-2 would then equal S-1, S-3 would be zero, there would be no input to any amplifier 330, not output from amplifier 330, and reed relay 340 would drop out. However since conditions are never ideal balance knob 290 must be adjusted to adjust potentiometer 304 so that reed relay 340 just drops out. As such amplifier 330 sees signal S-3 as zero and the signals S-2 and S-1 as being equal even though such may not be; thus adjusting for any spurious conditions.

The percent of acceptable difference is then set into speed comparator 250 by adjusting percent knob 292 and potentiometer 300 accordingly. The circuitry 302 is such that as the percent difference is increased the value of signal S-1 presented to amplifier 330 is decreased, thus creating a positive differential between S-2 and S-1. When a condition arises affecting the conveyor operation the signals S-2 and S-1 will be affected. When the signals appear to amplifier 330 as equal (i.e. S-3 = 0); or if S-1 exceeds S-2 (i.e. signal S-3 presented to amplifier 330 is negative there will be no output from amplifier 330 and reed relay 340 will deenergize to shut down the conveyor system.

Figure 7:
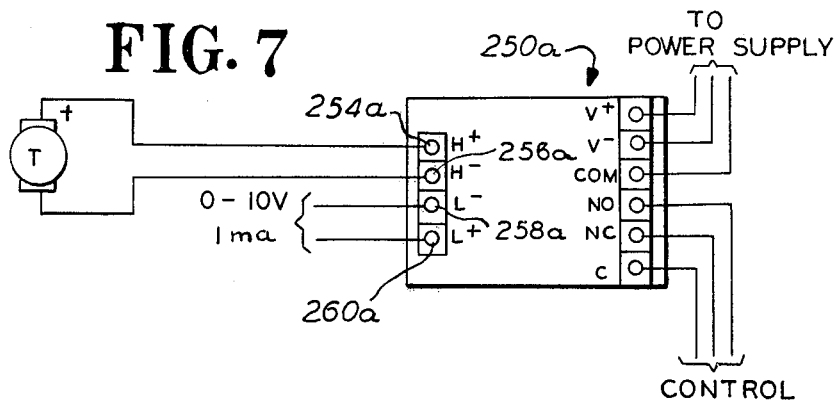
FIG. 7 is a schematic showing the speed comparitor of FIGS. 4 and 5 connected for overspeed control and with an externally generated signal indicative of the level for comparison and control.

FIG. 7 shows a speed comparitor 250a set up for overspeed control. The tachometer-generator output signal is applied to terminals 254a, 256a and will appear as signal I-1 in FIG. 5. An externally and conventionally generated reference signal of selected magnitude indicative of the proper speed is applied to terminals 258a, 260a and will appear as signal I-2 in FIG. 5. Other appropriate connections (not shown) are made to the conveyor system controls. The system is balanced as previously described and the desired percent difference set in via knob 292 and potentiometer 300. Signal S-2 will thus appear higher in value then signal S-1 by the selected difference. Amplifier 330 will have a positive input and output and reed relay 340 will remain energized.

As the speed being monitored increases the tachometer generator measuring same will put out a signal increasing in value. S-1 will accordingly increase also, and when it equals or exceeds S-2 amplifier 330 will shut down and reed relay 340 will de-energize stopping the conveyor system.

The condition creating the overspeed condition should then be corrected and the conveyor system restarted. No further adjustment of speed comparitor 250 need be made at this time.

Figure 8:
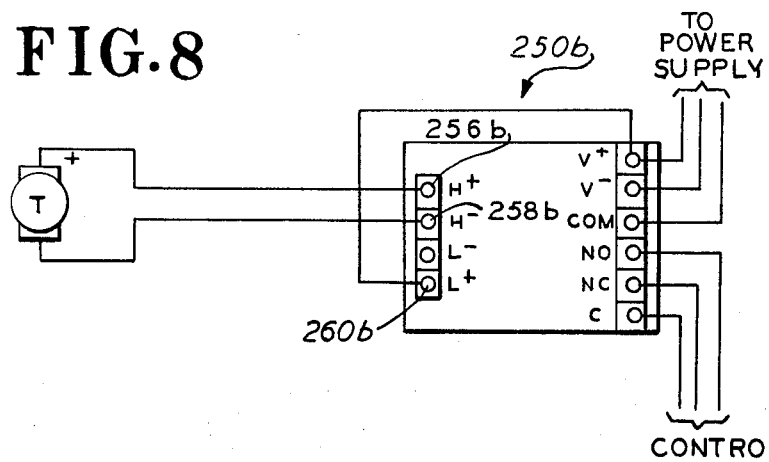
FIG. 8 is a schematic showing the speed comparitor of FIGS. 4 and 5 connected for overspeed control and with an internally generated signal indicative of the level for comparison and control.

In FIG. 8 a speed comparitor 250b is shown also setup for overspeed control, there again the input speed signal I-1 from the tachometer generator is applied to terminals 256b, 258b. The external reference signal source is eliminated in this embodiment but a reference signal I-2 is still required and supplied by connecting the V+ to terminal 260b. Otherwise operation is the same as for the overspeed comparison and control described for the FIG. 7 embodiment.

Figure 9:
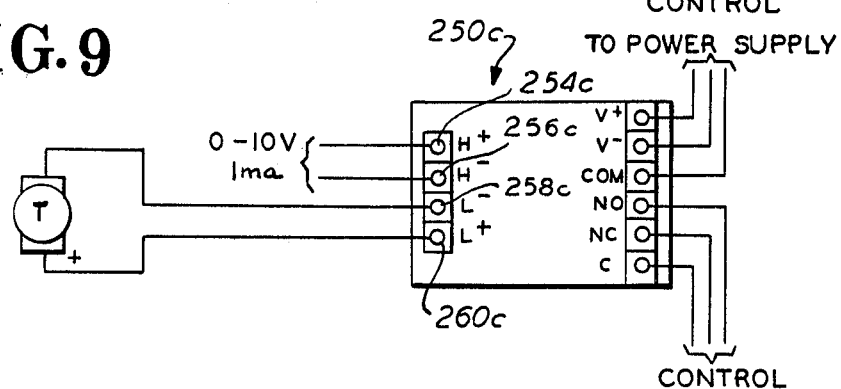
FIG. 9 is a schematic showing the speed comparitor of FIGS. 4 and 5 connected for underspeed control and with an externally generated signal indicative of the level for comparison and control.

FIG. 9 shows a speed comparitor 250c setup for underspeed control. The tachometer-generator output signal is applied to terminals 258c, 260c and will appear as signal I-2 in FIG. 5. An externally and conventionally generated reference signal of selected magnitude indicative of the proper speed is applies to terminals 254c, 256c and will appear as signal I-1 in FIG. 5. Other appropriate connections (not shown) are made to the conveyor system controls. The system is balanced as previously described and the desired percent difference set in via knob 292 and potentiometer 300. Signal S-2 will thus appear higher in value than signal S-1 by the selected difference. Amplifier 330 will have a positive input and output and reed relay 340 will remain energized.

As the speed being monitored decreases the tachometer generator measuring same will put out a signal decreasing in value. S-2 will accordingly decrease also, and when it equals or becomes smaller then S-1 amplifier 330 will shut down and reed relays 340 will de-energize the conveyor system.

The condition creating the underspeed condition should then be corrected and the conveyor system restarted. No further adjustment of speed comparitor 250 need be made at this time.

Figure 10:
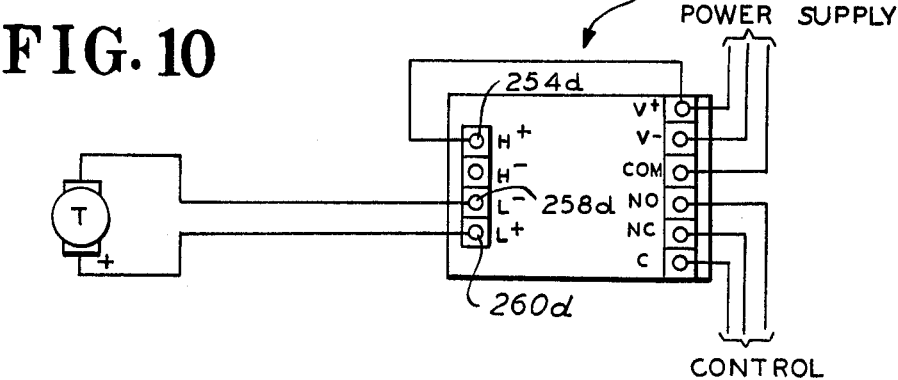
FIG. 10 is a schematic showing the speed comparitor of FIGS. 4 and 5 connected for underspeed control and with an internally generated signal indicative of the level for comparison and control.

In FIG. 10 a speed comparitor 250d is shown also set up for underspeed control, there again the input speed signal I-2 from the tachometer generator is applied to terminals 258d, 260d. The external reference source is eliminated in this embodiment but a reference signal I-1 is still required and supplied by connecting the V+ to terminal 254d. Otherwise operation is the same as for the underspeed comparison and control described for the FIG. 9 embodiment.

Figure 11:
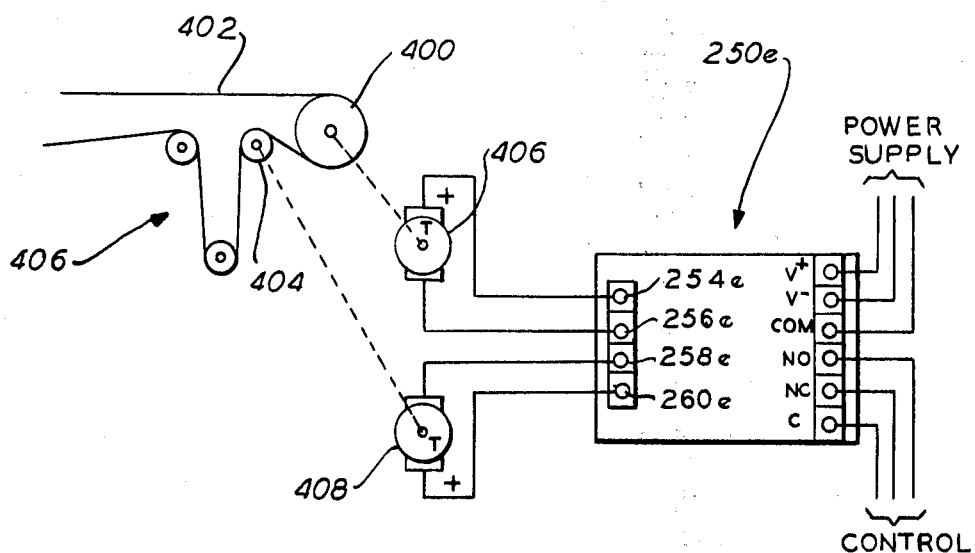
FIG. 11 is a schematic showing the speed comparitor of FIGS. 4 and 5 connected for differential speed control and which will exercise control in response to an excessive difference in speeds, or slip.

FIG. 11 shows a speed comparitor 250e set up for slip control. The intent here is to determine whether the input drive to a conveyor belt drive pulley 400 is being efficiently used and transferred to a conveyor belt 402. The speed of conveyor belt 402 is reflected by the speed of a driven pulley 404. Some amount of slip or loss is permitted but an excessive slip is indicative of a problem in the belt takeup 406 or elsewhere in the conveyor belt loop and requires shut down of the conveyor system.

In making the speed comparison a dc tachometer generator 406 is utilized to sense the speed of input drive 400. The output signal is applied to terminals 254e, 256e and appears as signal I-1 in FIG. 5. The drive speed is sensed by dc tachometer generator 408 with its output signal applied to terminals 258e, 260e and appearing as signal I-2 in FIG. 5. Initially percent knob 292 and potentiometer 300 are set to "0" and balance knob 290 and potentiometer 304 are adjusted as previously mentioned. This is accomplished while conveyor belt 402 is operating without slip. Thereafter an acceptable percentage slip is set into comparitor circuit by use of percent knob 292 and potentiometer 300. S-2 appears larger then S-1 and amplifier 330 receives a positive signal to keep relay 340 energized.

Any increase in slip will result in a slower movement of driven pulley 404 with a resultant decrease in signal S-2. When S-2 equals or falls below S-1 amplifier 330 will shut down, relay 340 will de-energize and the conveyor system will stop.

Figure 12:
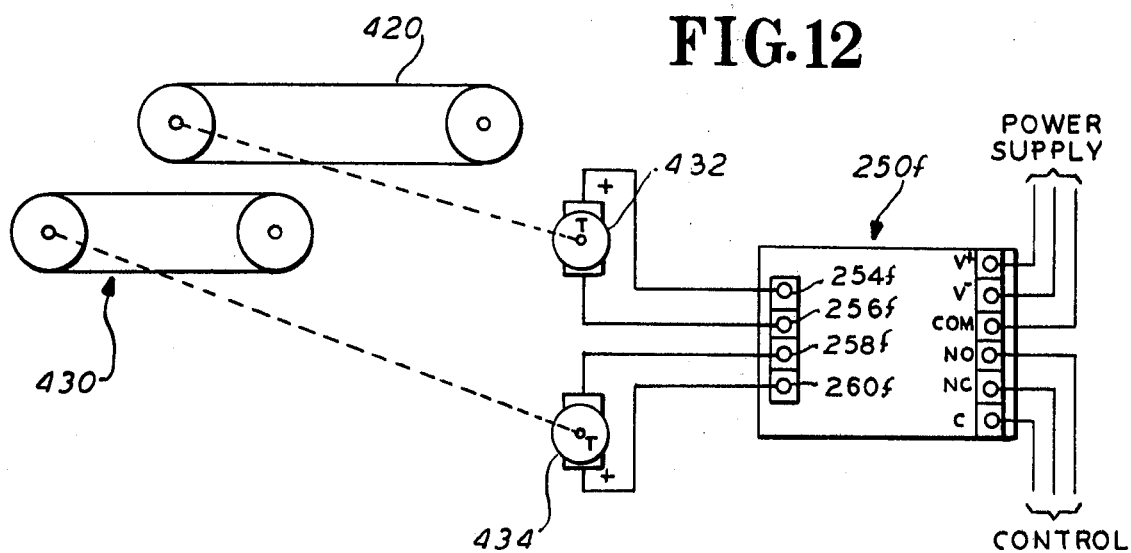
FIG. 12 is a schematic showing the speed comparitor of FIGS. 4 and 5 connected for differential speed control and which will exercise control in response to equalization of the speeds.

FIG. 12 shows a speed comparitor 250f set up to compare the output speed of a downstream conveyor 420 to the output speed of an upstream conveyor 430 through the use of tachometer generators 432, 434 respectively. Generally in this type of arrangement the upstream conveyor must run at a faster speed than the downstream conveyor; and any speed changes (increase in downstream conveyor speed or decrease in upstream conveyor speed) which bring the speeds together or which might reverse the relationship must be monitored.

Figure 5:
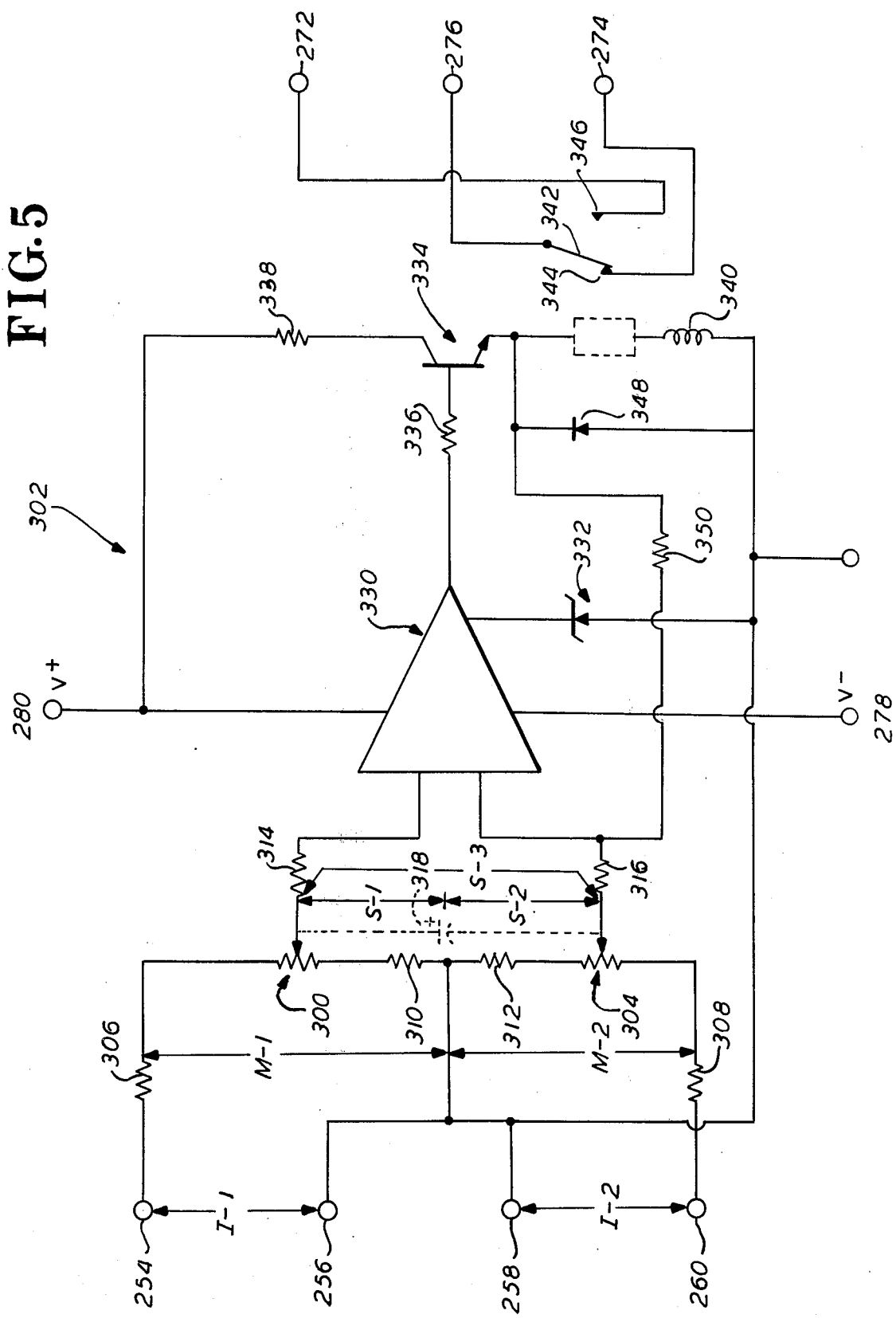
FIG. 5 is a schematic showing of the speed comparitor circuitry.

The output from the slower or upstream conveyor tachometer generator 432 is presented to terminals 254f, 256f and thus appears as signal I-1 in FIG. 5, while that of the faster of upstream conveyor is presented to terminals 258f, 260f and appears as signals I-2 in FIG. 5.

These signals begin with an initial condition which presents a positive output difference to amplifier 330. Accordingly with percent knob 292 and potentiometer 300 set to "0", balance knob 290 and potentiometer 304 are adjusted until such positive difference is eliminated and reed relay 340 de-energizes. Percent knob 292 and potentiometer 300 are then set to an acceptable percent change in the degree of acceptable speed differential between the upstream and downstream conveyors 430, 420

Any change in conveyor speed (either by increase in the speed of downstream conveyor 420 or decrease in speed of upstream conveyor 430) will be reflected in signals S-1 and/or S-2. Should the differential ever disappear or reverse then the combined outputs of signals S-1 and S-2 will appear as a negative signal to amplifier 330 which will then cease to provide an output to emitter follower 334. Reed relay 340 will deenergize and the conveyor system will shut down.

Figure 2:
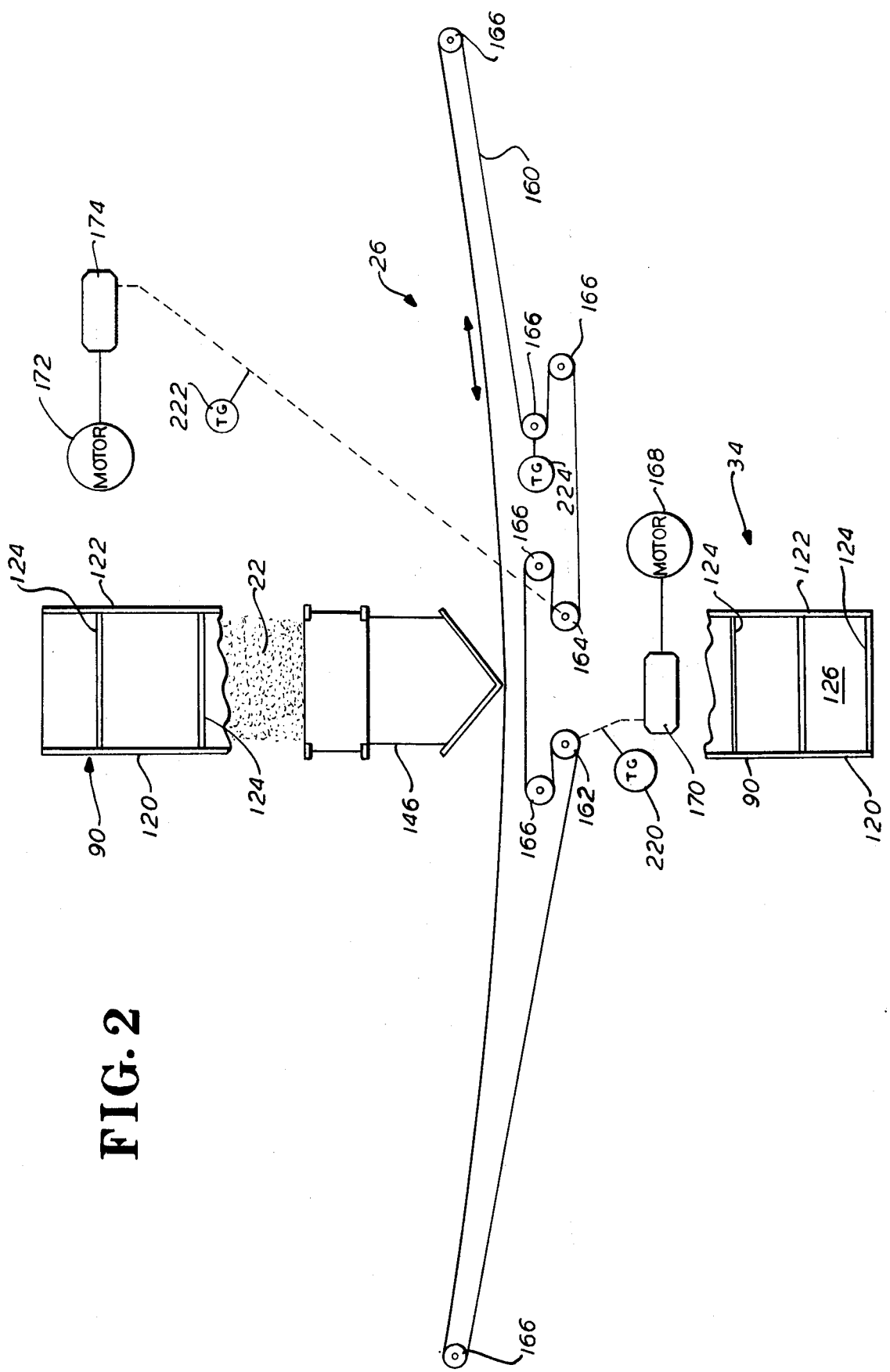
FIG. 2 is a schematic showing of the shuttle conveyor of FIG. 1.

The operation of the disclosed underspeed, overspeed, slip and differential speed control system, for the bulk material conveyor system of FIGS. 1 and 2, will be further described in the context of the entire system with reference to the block diagram of FIG. 3. The various motors and rear reducers, for the input drives previously described, receive their respective power input, and are provided with other controls (not shown) essential for their operation and the operation of the system, in conventional manner. The operation of these various controls is centralized at the operators master control console 44 (FIG. 3) which in conventional way is provided with buttons, switches, meters, etc. (not shown) required for the operation of the system.

From the console 44 the operator can manipulate control's for starting up the system in prescribed manner to put in motion downstream conveyor 30, upstream conveyor 32, elevator wheel assembly 34 and its seal belt 140, and shuttle conveyor 26. The operator can also operate gates 40, to control the flow of material 22 into the system, from console 44. Obviously the operator is also provided with conventional means (not shown) at console 44 for stopping the operation of any portion of the system or for stopping the entire system in either an emergency or non-emergency situation. Appropriate and conventionally arranged indicator lights and/or alarms (not shown) may also be provided for the operator at console 44 to signal the status of the component parts of the system.

It is within the circuitry for shutting down the system that the switches 342 (FIG. 5) actuated by reed relays 340 are incorporated in such a manner that the deenergization of any reed relay 340 will open the circuit and arrest operation of the system. As previously described this action through terminals 272, 276 may also operate a signal light, and/or alarm, to indicate the source of the trouble. The signal light and/or alarm, may be disposed at console 44 or at the location of the trouble or both.

In FIG. 3 block 502 represents tachometer generator 200 which senses the speed of input drive pulley 58 of downstream conveyor 30. The output signal from 502 serves as one of the inputs to downstream conveyor input drive pulley/output driven pulley slip comparitor 504. The other input to slip comparitor 504 is the signal from downstream conveyor tachometer generator 204 which senses the speed of driven pulley 62 and is represented by block 506. The input signals to comparitor 504, and the operation thereof, is as previously described for slip comparison speed control with respect to FIG. 11 An excessive slip indication at comparitor 504 would, in turn, be transmitted to operator console 44 to shut down the system.

Additional output signals from downstream conveyor tachometer generator 204, as represented by block 506, are also transmitted to downstream conveyor driven pulley underspeed and overspeed comparitors 508 and 510 respectively, and to a downstream conveyor driven pulley/upstream conveyor driven pulley differential speed comparitor 512. The input signals to underspeed comparitor 508 and overspeed comparitor 510, and the operation thereof is as previously described for underspeed and overspeed comparison speed control with respect to FIG. 9 and 11 respectively. The externally generated reference signal is provided to comparitors 508 and 510 from an appropriate and conventional signal generator 514 (FIG. 3).

The upstream conveyor driven pulley speed signal is provided to differential speed comparitor 512 from upstream conveyor driven pulley tachometer generator 214 which senses the speed of upstream conveyor driven pulley 78 and is represented in FIG. 3 as block 520. The input signals to differential speed comparitor 512 and the operation thereof, is as previously described for differential speed comparison with respect to FIG. 12.

Additional signals from upstream conveyor tachometer generator 214 (block 520) are utilized as inputs to upstream conveyor driven pulley underspeed and overspeed comparitors 522 and 524 respectively. The input signals to underspeed comparitor 522 and overspeed comparitor 524, and the operation thereof is as previously described for underspeed and overspeed comparison speed control with respect to FIGS. 8 and 10 respectively.

Another signal from upstream conveyor driven pulley tachometer generator 214 (block 520) is utilized as an input to an upstream conveyor drive pulley/driven pulley slip comparitor 526. The drive speed signal to comparitor 526 may be transmitted from either of the upstream conveyor drive speed pulley tachometer generators 206 or 210, which sense the speed of input drive pulleys 72 and 74 and are represented herein by a single block 528. The comparison is as for slip comparison previously described for FIG. 11.

A further signal from upstream conveyor driven pulley tachometer generator 214 (block 520) is utilized as an input to an upstream driven pulley/elevator wheel slip comparitor 530. The elevator wheel signal to comparitor 530 is transmitted from elevator wheel driven pulley tachometer-generator 216 which, senses the speed of elevator wheel 90, and is represented herein by block 532. The comparison is as for slip comparison previously described for FIG. 11.

The output signal from elevator wheel tachometer generator 216 (block 532) is also transmitted to an elevator wheel/seal belt slip comparitor 534, which receives its other input signal from seal belt driven pulley tachometer generator 218, block 536 (which senses the speed of seal belt driven pulley 142) and makes the slip comparison as described for FIG. 11.

A still further signal from upstream conveyor driven pulley tachometer generator 520 provides one of the input signals to an upstream conveyor driven pulley/shuttle conveyor drive pulley differential speed comparitor 538. The other signal input to comparitor 538 is derived from shuttle belt driven pulley tachometer 224 block 540. The comparison is as previously described for FIG. 12.

Additional signal outputs from shuttle conveyor driven pulley tachometer 224, block 540 are transmitted to a shuttle conveyor driven pulley underspeed comparitor 542, and to a shuttle conveyor driven pulley/drive pulley slip comparitor 544. The drive speed input signal to comparitor 544 is derived from shuttle drive pulley tachometer generator 220 or 222, block 546. The shuttle belt underspeed comparitor 542 and drive pulley/driven pulley slip comparitor 544 operating as previously described for similar comparisons.

From the above description it will thus be seen that a novel and improved bulk material conveyor system underspeed, overspeed, slip, and differential speed control system has been provided; which control system utilize signals indicative of the speeds of the various input drive pulleys and output drive pulleys, as may be generated by dc tachometer generators, as inputs to simple and efficient speed comparitors; their being one such comparitor for each comparison to be made, with each comparitor including an input network selectively settable to balance the inputs, and selectively settable to establish the acceptable percent of difference to be allowed, and with each comparitor further including an operational amplifier for comparing the input signals and which applies an output, in response to an acceptable comparison, to an emitter follower to maintain a control relay and the system energized, but which is cut off and in turn cuts off the emitter follower, control relay and system in response to an unacceptable comparison.

It is understood that although I have shown the preferred form of my invention that various modifications may be made in the details thereof without departing from the spirit as comprehended by the following claims.

I claim:

1. A speed comparitor and equipment control comprising:
   a. first input circuit means;
   b. second input circuit means;
   c. said first and said second input circuit means being respectively adapted to receive first and second input signals each indicative of a speed;
   d. signal summation circuit means, coacting with said first input circuit means and said second input circuit means, and respectively including first signal modification means and second signal modification means electrically interconnected by circuit element means to respectively receive said first and said second input signals and to modify same in selected and predetermined manners and so that respective first and second output signals are generated in such a manner that said first output signal is always negative in value with respect to said second output signal;
   e. said signal summation circuit means summing said first output signal and said second output signal so as to provide a summation circuit output signal;
   f. operational amplifier circuit means coacting with said signal summation circuit means to receive said summation circuit output signal therefrom, and electrically interconnected with amplifier circuit means to provide an amplifier circuit output signal of predetermined magnitude, but only in response to a summation circuit output signal which is positive in value;
   g. equipment control circuit means responsive to said amplifier circuit output signal to establish a closed equipment circuit to render operative selected equipment when electrically interconnected thereto, and to open said equipment circuit, upon failure of said operational amplifier circuit means to provide said amplifier output signal, to render said selected equipment inoperative.

2. The speed comparitor and equipment control of claim 1 wherein:
   a. said first signal modification circuit means is selectively variable to reduce the value of said first input signal by a predetermined amount indicative of a percentage of acceptable variance between a rate of speed represented by said second input signal and a rate of speed represented by said first input signal;
   b. said summation circuit output signal remaining positive and said amplifier circuit output signal maintaining said equipment circuit closed and said equipment operative as long as a predetermined differential exists between said first input signal and said second input signal that is within said percentage of acceptable variance;

c. said summation circuit output signal becoming negative to cut-off said amplifier circuit output signal to open said equipment circuit and render inoperative said equipment when said predetermined differential no longer exists.

3. The speed comparitor and equipment control of claim 2 wherein:
   a. said first input signal is received from first signal generating means disposed for coaction with and so as to measure the speed of a moving element of bulk material moving equipment means and is indicative of the actual speed of said moving element; and
   b. said second input signal is derived from a reference signal source and is indicative of the desired speed for said moving element;
   c. said first input signal increasing in value as said speed of said moving element increases;
   d. said signal summation circuit means being responsive thereto to render said bulk material moving equipment means inoperative when said differential disappears indicating a predetermined and selected unacceptable percentage of overspeed for said moving element.

4. The speed comparitor and equipment control of claim 3 wherein said first signal generating means is a dc tachometer generator.

5. The speed comparitor and equipment control of claim 3 wherein said moving element is the input drive shaft to said bulk material moving equipment means.

6. The speed comparitor and equipment control of claim 2 wherein:
   a. said second input signal is received from second signal generating means disposed for coaction with and so as to measure the speed of moving element of bulk material conveying equipment means and is indicative of the actual speed of said moving element; and
   b. said first input signal is derived from a reference signal source and is indicative of the desired speed for said moving element;
   c. said second input signal decreasing in value as said speed of said moving element decreases, and
   d. said signal summation circuit means being responsive thereto to render said bulk material moving equipment means inoperative when said differential disappears indicating a predetermined and selected unacceptable percentage of underspeed for said moving element.

7. The speed comparitor and equipment control of claim 6 wherein said moving element is a driven element of said bulk material moving equipment means.

8. The speed comparitor and equipment control of claim 2 wherein:
   a. said first input signal is received from first signal generating means disposed for coaction with and so as to measure the speed of a first moving element of bulk material moving equipment means and is indicative of the acutal speed of said first moving element;
   b. said second input signal is received from second signal generating means disposed for coaction with and so as to measure the speed of a second moving element of bulk material moving equipment means and is indicative of the actual speed of said second moving element;
   c. said first input signal increasing in value as said speed of said first moving element increases and decreasing in value as said speed of said first moving element decreases, and said second input signal increasing in value as said speed of said second moving element increases and decreasing in value as said speed of said second moving element decreases;
   d. said signal summation circuit means being responsive thereto to render said bulk material moving equipment means inoperative when said differential disappears indicating a predetermined and selected unacceptable percentage differential between the speed of said first moving element and said second moving element.

9. The speed comparitor and equipment control of claim 8 wherein a said first moving element is the input drive shaft to said bulk material moving equipment means and said second moving element is a driven element of said same bulk material moving equipment means.

10. The speed comparitor and equipment control of claim 2 wherein:
    a. said first input signal is received from generating means disposed for coaction with and so as to measure the speed of a first moving element of first bulk material moving equipment means and is indicative of the actual speed of said first moving element; and
    b. said second input signal is received from second signal generating means disposed for coaction with and so as to measure the speed of a second moving element of a second bulk material moving equipment means and is indicative of the actual speed of said second moving element; and
    c. said first input signal changing in value as said speed of said first moving element changes in value, and said second input signal changing in value as said speed of said second moving element changes in value;
    d. said signal summation circuit means being responsive thereto to render said bulk material moving equipment means inoperative when said differential disappears indicating a predetermined and selected unacceptable percentage differential between the speed of said first bulk material moving equipment means and the speed of said second bulk material moving equipment means.

11. The speed comparitor and equipment control of claim 1 wherein said second signal modification circuit means is selectively variable to compensate for variances in circuit conditions and so as to render said first input signal and said second input signal equal in value when in fact they should be.

12. The speed comparitor and equipment control of claim 1 wherein said equipment control circuit means includes an emitter follower electrically connected to said operational amplifier circuit means and to a reed relay to control the operation thereof and thereby of said equipment circuit.

13. A bulk material moving system: comprising
    a. a plurality of bulk material moving means;
    b. a plurality of input drive means, their being one of said input drive means for each one of said bulk material moving means to provide motive power thereto;

c. a plurality of speed comparitor and equipment control means each operative in a first condition thereof to render an associated piece of equipment operable and each operative in a second condition thereof to render an associated piece of equipment inoperative;

d. a master control means interconnected to each of said speed comparitor and equipment control means and to each of said input drive means to control operation of said input drive means and thereby of said bulk material moving means depending upon said first and said second conditions of said speed comparitor and equipment control means;

e. a plurality of speed responsive signal generating means each of which provides an electrical signal output indicative of the speed of a moving element when disposed for coaction with a moving element;

f. selected ones of said spaced responsive signal generating means being disposed for coaction with selected ones of said input drive means to provide electrical signals indicative of the speeds of said input drive means and selected others of said speed responsive signal generating means being disposed for coaction with selected driven means disposed for coaction with selected ones of said input drive means;

g. each of said speed responsive signal generating means being connected in circuit to a selected one of said speed comparitor and equipment control means to provide an input signal thereto;

h. each of said input signals when so provided being summed, by circuit means included as a part of said speed comparitor and equipment control means, with either another of said input signals, or with a reference signal from a reference signal source also provided to said speed comparitor and equipment control means such that a positive sum will result in said speed comparitor and equipment control means assuming said first condition, and a negative sum will result in said speed comparitor and equipment control means assuming said second condition;

i. first selectively adjustable circuit modification means included as part of each of said speed comparitor and equipment control means to receive and selectively modify first one of said input signals when so provided to said speed comparitor and equipment control means, and in such a way as to reduce the magnitude thereof with respect to a predetermined reference level to thus establish a percentage acceptable variance for the speed comparitor and equipment control means within which said first condition will obtain and beyond which said second condition will obtain; and j. second selectively adjustable circuit modification means included as part of each of said speed comparitor and equipment control means to receive and selectively modify a second one of said input signals, when so provided to said speed comparitor and equipment control means, and in such a way as to compensate for variations between circuit components to establish the level at which said second condition will obtain.

14. The bulk material moving system of claim 13 wherein said speed responsive signal generating means are dc tachometer generators.

15. The bulk material moving system of claim 13 wherein said selectively adjustable circuit modification means are potentiometers.

16. The bulk material moving system of claim 13 wherein a. at least one of said bulk material moving means is a bulk material conveyor;

b. a first speed comparitor and equipment control means is operatively associated with said bulk material conveyor to compare the speed of said input drive to said conveyor with a predetermined reference level speed and so that said speed comparitor and equipment control means assumes said second condition in response to an overspeed condition for said bulk material conveyor;

c. a second speed comparitor and equipment control means is operatively associated with said bulk material conveyor to compare the speed of a driven element of said bulk material conveyor with the speed of said input drive to said bulk material conveyor and so that said speed comparitor and equipment control means assumes said second condition in response to an excessive difference between said input drive speed and said speed of said driven element of said bulk material conveyor;

d. a second one of said bulk material moving means is a bulk material elevator coacting with and driven by said bulk material conveyor and disposed to receive material therefrom; and e. a third said speed comparitor and equipment control means is operatively associated with said bulk material elevator to compare the speed of a driven element of said bulk material elevator with the speed of said driven element of said bulk material conveyor and so that said speed comparitor and equipment control means assume said second condition in response to an excessive difference between said speed driven element of said bulk material elevator and said driven element of said bulk material conveyor.

* * * * *